US012468974B2

(12) United States Patent
Biercuk et al.

(10) Patent No.: US 12,468,974 B2
(45) Date of Patent: Nov. 11, 2025

(54) QUANTUM CONTROL DEVELOPMENT AND IMPLEMENTATION INTERFACE

(71) Applicant: Q-Ctrl Pty Ltd, Sydney (AU)

(72) Inventors: Michael Biercuk, Sydney (AU); Michael Robert Hush, Sydney (AU); Harrison Ball, Sydney (AU); Michael Dijkstra, Sydney (AU); Kevin Nguyen, Sydney (AU); Robert Love, Sydney (AU)

(73) Assignee: Q-Ctrl Pty Ltd, Sydney (AU)

( * ) Notice: Subject to any disclaimer, the term of this patent is extended or adjusted under 35 U.S.C. 154(b) by 1374 days.

(21) Appl. No.: 16/972,222

(22) PCT Filed: May 31, 2019

(86) PCT No.: PCT/AU2019/050555
§ 371 (c)(1),
(2) Date: Dec. 4, 2020

(87) PCT Pub. No.: WO2019/232572
PCT Pub. Date: Dec. 12, 2019

(65) Prior Publication Data
US 2021/0311442 A1    Oct. 7, 2021

(30) Foreign Application Priority Data

Jun. 6, 2018 (AU) .............................. 2018902019
Oct. 31, 2018 (AU) .............................. 2018256557

(51) Int. Cl.
*G06N 10/60*    (2022.01)
*G06F 3/0482*    (2013.01)
(Continued)

(52) U.S. Cl.
CPC ............ *G06N 10/60* (2022.01); *G06F 3/0482* (2013.01); *G06N 10/40* (2022.01); *G06N 10/70* (2022.01)

(58) Field of Classification Search
CPC ........ G06N 10/60; G06N 10/40; G06N 10/70; G06N 10/80; G06F 3/0482; B82Y 10/00
See application file for complete search history.

(56) References Cited

U.S. PATENT DOCUMENTS 5,285,197 A * 2/1994 Schmidt ................... G09G 1/16
                                                         345/213
5,768,297 A    6/1998 Shor
(Continued)

FOREIGN PATENT DOCUMENTS

AU          2018256557 B1    5/2019
WO     WO-2019232572 A1    12/2019

OTHER PUBLICATIONS

Almog et al. Direct measurement of the system-environment coupling as a tool for understanding decoherence and dynamical decoupling, Mar. 6, 2011, 9 pages (Year: 2011).*
(Continued)

*Primary Examiner* — Omar F Fernandez Rivas
*Assistant Examiner* — Tri T Nguyen
(74) *Attorney, Agent, or Firm* — Schwegman Lundberg & Woessner, P.A.

(57) ABSTRACT

This disclosure relates to quantum computing systems including a quantum processor that implements one or more operations on multiple qubits and a distributed data processing system programmed to perform calculations to determine control sequences that, when applied to the quantum processor, reduces decoherence, decoherence-induced errors, and control-imperfection-induced errors on the one or more operations on the multiple qubits. A user interface device remote from the distributed data processing system
(Continued)

receives from a user of the quantum processor characteristics of the quantum processor including operational constraints and/or desired performance, and sends the characteristics to the data processing system to cause the data processing system to perform the calculations to determine the control sequence based on the characteristics.

21 Claims, 11 Drawing Sheets

(51) Int. Cl.
*G06N 10/40* (2022.01)
*G06N 10/70* (2022.01)

(56) References Cited

U.S. PATENT DOCUMENTS

| | | | | |
|---|---|---|---|---|
| 5,828,983 | A * | 10/1998 | Lombardi | G01R 19/02 324/76.38 |
| 6,078,872 | A * | 6/2000 | Carson | G01R 33/46 324/309 |
| 7,113,967 | B2 * | 9/2006 | Cleve | B82Y 10/00 257/14 |
| 11,666,262 | B2 * | 6/2023 | Yamagata | A61B 5/7239 600/409 |
| 2007/0174227 | A1 | 7/2007 | Johnson et al. | |
| 2009/0241013 | A1 * | 9/2009 | Roetteler | H03M 13/19 714/752 |
| 2009/0316842 | A1 * | 12/2009 | Lu | H04L 1/20 375/346 |
| 2011/0060780 | A1 * | 3/2011 | Berkley | B82Y 10/00 708/620 |
| 2014/0223224 | A1 * | 8/2014 | Berkley | G06F 11/0724 714/10 |
| 2015/0015893 | A1 * | 1/2015 | Nakahira | G06T 7/0008 356/495 |
| 2015/0324705 | A1 * | 11/2015 | Biercuk | G06F 3/061 711/101 |
| 2016/0292586 | A1 | 10/2016 | Rigetti et al. | |
| 2017/0017894 | A1 | 1/2017 | Lanting et al. | |
| 2017/0214410 | A1 | 7/2017 | Hincks et al. | |
| 2017/0339027 | A1 * | 11/2017 | Barrett | G06F 9/5072 |

OTHER PUBLICATIONS

Biercuk, Michael J., et al., "Optimized dynamical decoupling in a model quantum memory", Nature; vol. 458, (Apr. 23, 2009), 996-1000.
Bukov, Marin, et al., "Reinforcement Learning in Different Phases of Quantum Control", Physical Review X 8, 031086 (2018), (Sep. 27, 2018), 15 pgs.
Niu, Murphy Yuezhen, et al., "Universal Quantum Control through Deep Reinforcement Learning", arXiv:1803.01857v2 [quant-ph] Apr. 16, 2018, (Apr. 16, 2018), 21 pgs.
Palittapongarnpim, Pantita, et al., "Learning in Quantum Control: High-Dimensional Global Optimization for Noisy Quantum Dynamics", arXiv:1607.03428v3 [cs.LG] Nov. 25, 2016, (Nov. 25, 2016), 32 pgs.
Zahedinejad, Ehsan, "Machine Learning for Designing Fast Quantum Gates", Unpublished doctoral thesis; University of Calgary, Calgary, AB. doi:10.11575/PRISM/268905; http://hdl.handle.net/11023/2780, (Jan. 26, 2016), 196 pgs.
"Australian Application No. 2018902019, Australian Patent Office International—Type Search Report mailed Sep. 27, 18", (Sep. 27, 2018), 15 pgs.
"International Application No. PCT/AU2019/050555, International Search Report and Written Opinion mailed Jul. 19, 19", (Jul. 19, 2019), 11 pgs.
Alvarez, Gonzalo A., et al., "Measuring the spectrum of colored noise by dynamical decoupling", Physical Review Letters 107, 230501 (2011), (Dec. 2, 2011), 5 pgs.
Ball, Harrison, et al., "The role of master clock stability in quantum information processing", npj Quantum Information (2016) 2, 16033; doi:10.1038/npjqi.2016.33, (Nov. 8, 2016), 8 pgs.
Ball, Harrison, et al., "Walsh-synthesized noise filters for quantum logic", EPJ QuantumTechnology (2015) 2:11, (2015), 45 pgs.
Debnath, S., et al., "Demonstration of a small programmable quantum computer with atomic qubits", Nature 536, No. 7614 (2016): 63, (Aug. 3, 2016), 10 pgs.
Edwards, Simon C., et al., "Optimal Quantum Filtering and Quantum Feedback Control", arXiv preprint quant-ph/0506018 (2005), (2005), 14 pgs.
Frey, V. M., et al., "Application of optimal band-limited control protocols to quantum noise sensing", Nature Communications 8, 2189 (2017), (2017), 8 pgs.
Green, Todd J., "Arbitrary quantum control of qubits in the presence of universal noise", New Journal of Physics 15 (2013), (Sep. 12, 2013), 29 pgs.
Green, Todd J., et al., "Phase-modulated decoupling and error suppression in qubit- oscillator systems", Physical Review Letters 114 120502 (2015), (2015), 7 pgs.
Gupta, Riddhi Swaroop, et al., "Machine learning for predictive estimation of qubit dynamics subject to dephasing", Physical Review Applied 9, No. 6 (2018), (2018), 33 pgs.
Lamb, Ian Conway, "Cryogenic Control Beyond 100 Qubits", Master of Science in Physics thesis, School of Physics, The University of Sydney, Jul. 2017, (Jul. 2017), 103 pgs.
Mariantoni, Matteo, et al., "Implementing the Quantum von Neumann Architecture with Superconducting Circuits", Science (2011): 1208517, (2011), 43 pgs.
Mavadia, Sandeep, et al., "Prediction and real-time compensation of qubit decoherence via machine learning", Nature Communications 8, 14106 (2017), (Jan. 16, 2017), 6 pgs.
Norris, Leigh M., et al., "Optimally band-limited spectroscopy of control noise using a qubit sensor", Phys. Rev. A 98, 032315 (2018), (Mar. 22, 2018), 24 pgs.
Sastrawan, J., et al., "Analytically exploiting noise correlations inside the feedback loop to improve locked-oscillator performance", Physical Review E 94, 022204 (2016), (Aug. 8, 2016), 10 pgs.
Soare, A., et al., "Experimental noise filtering by quantum control", Nature Physics 10, 825-829 (2014), (Oct. 19, 2014), 825-829.

* cited by examiner

QUANTUM CONTROL DEVELOPMENT AND IMPLEMENTATION INTERFACE

CROSS-REFERENCE TO RELATED APPLICATIONS

This application is a U.S. national stage filing under 35 U.S.C. & 371 from International Application No. PCT/AU2019/050555, filed on 31 May 2019, and published as WO2019/232572 on 12 Dec. 2019, which claims the benefit under 35 U.S.C. 119 to Australian Provisional Patent Application No. 2018256557, filed on 31 Oct. 2018, and Australian Provisional Patent Application No. 2018902019 filed on 6 Jun. 2018, the benefit of priority of each of which is claimed herein, and which the contents are incorporated herein by reference in their entirety.

TECHNICAL FIELD

This disclosure relates to a quantum control development and implementation interface.

BACKGROUND

Quantum computers are an emerging technology and a number of different technologies exist to implement quantum computers, including ion traps, nitrogen vacancies, superconducting qubits and electron and nuclear spins in semiconductors and other crystal structures. For each of these technologies there are a wide range of different configurations and microscopic details, such as the number and spatial arrangement of qubits implemented or the physical environments experienced by the qubits. As a result, each quantum computer has its own specific characteristics that makes it different to other quantum computers.

However, one common theme for quantum computers is that quantum information deteriorates quickly and complex algorithms are required to create control sequences that can stabilize the quantum information. But it is difficult to determine and execute these control algorithms for a particular quantum computer which holds back the effective use of quantum computing technology.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A quantum computing system comprises a quantum processor that implements one or more operations on multiple qubits having qubit states and a distributed data processing system programmed to perform calculations to determine control sequences that, when applied to the quantum processor in the form of an electromagnetic field to directly control the qubit states, reduces decoherence, decoherence-induced errors, and control-imperfection-induced errors on the one or more operations on the multiple qubits, wherein the calculations are based on noise characteristics of the quantum processor to determine a noise-suppressing control sequence. A user interface device remote from the distributed data processing system receives from a user of the quantum processor characteristics of the quantum processor including operational constraints and/or desired performance, and sends the characteristics to the distributed data processing system to cause the distributed data processing system to perform the calculations to determine the noise-suppressing control sequence based on the characteristics.

It is a problem that noise characteristics of quantum processor vary over time. While existing calculations can provide a single control sequence once, the advantage of the above system is that those variations over time are compensated because the calculations can be completed within a similar time frame as the variations occur. In other words, the calculations can be repeated "on the fly" and while the quantum processor is in operation. This is only possible due to the calculations on the distributed data processing system because incorporating noise characteristics to determine a noise-suppressing control sequence for multiple qubits is computationally challenging.

It is a further advantage that the functionality is separated into a user interface device and the distributed data processing system because the required calculations are computationally complex and many users of quantum computing hardware platforms do not have the resources to build their own high-performance local processing system. Further, users generally have limited access to software that performs the required calculations for their specific platform. Therefore, it is another advantage that the user interface collects the characteristic and sends them to the distributed data processing system and returns deployable control solutions for the user. This way, the specific characteristics of the platform are considered in the calculations, which leads to an improved control sequence that, in turn, leads to reduced decoherence and reduced error rates in the qubits. Controls determined in this way can include any single and multi-qubit logic operations from a universal gate set as well as the organization of these operations into quantum circuits used in algorithms.

The system may further comprise embedded code within the quantum processor that autonomously optimizes the quantum processor in communication with the distributed data processing system.

There is also provided a method for controlling a quantum processor that implements one or more operations on multiple qubits having qubit states. The method comprises:
  generating a user interface to receive from a user of the quantum processor user input in relation to characteristics of the quantum processor;
  receiving the user input on a distributed data processing system;
  performing calculations on the distributed data processing system based on the user input to determine a control sequence that, when applied to the quantum processor in the form of an electromagnetic field to directly control the qubit states, reduces decoherence and decoherence-induced errors on the one or more operations on the multiple qubits, wherein the calculations are based on noise characteristics of the quantum processor to determine a noise-suppressing control sequence.

The user input may comprise a request for determining characteristics of the quantum processor and the method may comprise performing calculations on the distributed data processing system based on the user input to determine a control sequence that, when applied to the quantum processor, allows a measurement of the characteristics of the quantum processor.

The noise characteristics of the quantum processor comprise distortions of the platform.

Measurement of the noise characteristics may comprise calculating a frequency domain filter function on the distributed data processing system for the determined control sequence and applying the filter function to direct measurements from the quantum processor.

The user input may comprise an indication of one or more control waveforms created by the user through the user interface.

The user input may comprise an indication of one or more protocols or waveforms or both from a pre-computed library selected by the user through the user interface.

The control sequence may be an open-loop control sequence.

The calculations may be to analyze control waveforms to determine an error budget of the multiple qubits and display the error budget on the user interface.

The calculations may be based on noise characteristics.
The noise characteristics may be based on one or more of:
a predefined clock noise;
a predefined ambient dephasing;
a predefined amplitude noise;
a predefined noise in all Cartesian coordinates (x, y, z);
a noise spectrum suitably defined and determined by user measurements; and a noise spectrum determined from the user input.

The calculations may be based on multiple measurements from the quantum computing hardware platform over time to iteratively and autonomously optimize the control sequence.

The calculations may comprise determining a first control sequence to characterize noise in the quantum computing hardware platform and determining a second control sequence based on the determined noise.

The method may further comprise:
receiving on the distributed data processing system, current measurements from the quantum computing hardware platform;
adjusting the control sequence based on the current measurements; and
sending the adjusted control sequence to the quantum computing hardware platform.

The calculations may comprise determining an error budget for a particular control operation on the multiple qubits based on input, selected, or measured noise, and adjusting the control sequences to minimize an error of the one or more operations on the multiple qubits.

The method may further comprise generating on the user interface a visualization of the characteristics or the determined control sequence or both.

The calculations may comprise determining a predicted estimation of an evolution of the multiple qubits based on measurements of the multiple qubits and adjusting the control sequence based on the predicted estimation.

The control sequence may cause the multiple qubits to adopt adjusted system dynamics that are different from native system dynamics of the quantum computing hardware platform to thereby expand the computational capabilities of the system.

There is further provided a method for controlling a quantum computing processor that implements one or more operations on multiple qubits having qubit states. The method comprises:

executing code embedded into the quantum processor to receive measurements in relation to the multiple qubits;
determine a first set of control parameters based on
the measurements,
control data stored with the embedded code, and
calculations performed by the embedded code;
connect to a distributed data processing system to cause the distributed data processing system to determine a second set of control parameters based on calculations performed by the distributed data processing system and based on noise characteristics of the quantum processor to allow determination of a noise-suppressing control sequence;
determine based on the first set of parameters and the second set of parameters the noise-suppressing control sequence that, when applied to the quantum processor in the form of an electromagnetic field to directly control the qubit states, reduces decoherence and decoherence-induced errors on the one or more operations on the multiple qubits.

The method may further comprise repeating the steps of determining the first set of control parameters and connecting to the distributed data processing system based on a schedule.

The method may further comprise:
repeatedly storing the first set of control parameters and the second set of control parameters on a look-up table according to the schedule; and
applying the noise-suppressing control sequence to the multiple qubits by reading the first set of control parameters and the second set of control parameters from the look-up table between scheduled updating of the first set of parameters and the second set of parameters.

A quantum processor comprises:
multiple qubits configured to implement one or more operations on the multiple qubits;
code embedded into the quantum processor to perform the following steps when executed:
receive measurements in relation to the multiple qubits;
determine a first set of control parameters based on
the measurements,
control data stored with the embedded code, and
calculations performed by the embedded code;
connect to a distributed data processing system to cause the distributed data processing system to determine a second set of control parameters based on calculations performed by the distributed data processing system and based on noise characteristics of the quantum processor to allow determination of a noise-suppressing control sequence; and
determine based on the first set of parameters and the second set of parameters the noise-suppressing control sequence;
a controlled source to apply the noise-suppressing control sequence to the quantum processor to reduce decoherence and decoherence-induced errors on the one or more operations on the multiple qubits.

Optional features described of any aspect of method, computer readable medium or computer system, where appropriate, similarly apply to the other aspects also described here.

BRIEF DESCRIPTION OF DRAWINGS

An example will be described with reference to the following drawings.

DESCRIPTION OF EMBODIMENTS

This disclosure provides a quantum computing system where a user, such as a researcher or an operator of a commercial quantum computer, can interact with an intuitive user interface to determine and execute stabilizing controls for the qubits. In particular, the user interface helps the user to identify suitable controls to be executed on the quantum computing system. The user interface interacts with a cloud-based computing system to execute algorithms for the characterization of quantum computing hardware, performance evaluation of various control approaches given this characterization, and optimization of controls given this characterization. The result is that the cloud system returns a control sequence that reduces errors induced by control or imperfections in the control hardware in the quantum computer and returns performance metrics such as error probabilities. These algorithms are computationally so intensive that they are impractical to run on a local computer. Instead, the cloud can spin-up a large number of machines in a relative short timeframe to meet the demand at hand. The calculated control sequence can then be applied to the qubit in their operation.

In other words, a quantum control system is designed to produce and execute noise-aware/noise-suppressing quantum controls. This is distinct from purely static distortions as this disclosure focuses on potentially time-varying perturbations that can reduce the fidelity of an operation and which are addressed by the control design disclosed herein.

Noise suppressing quantum controls can be created through one of two primary methods:

1) Time-domain "robust control" in which an optimizer seeks to produce an optimized control signal which is robust against realistic time-domain perturbations added during the optimization process. The optimizer selects solutions which minimize the user-defined cost function in the presence of these added perturbations.

2) Optimized filtering using multi-dimensional filter functions calculated for an arbitrary-dimensional Hilbert space (i.e. quantum system). Here the system calculates the filter function for a control and optimize properties of the frequency-domain filter function response to suppress dominant noise processes.

In both cases the addition of noise-awareness/suppression to the optimization process adds significant computational complexity that is well handled by a distributed solution, permitting the use of parallel computation such as cloud-based multi-core processors and/or Graphical processing units, in addition to conventional processors. This may be physically remote or on site, but is separated from "embedded" processing designed to handle simpler tasks in so-called "tight-SWAP" (tight size, weight, and power) settings.

Figure 1:
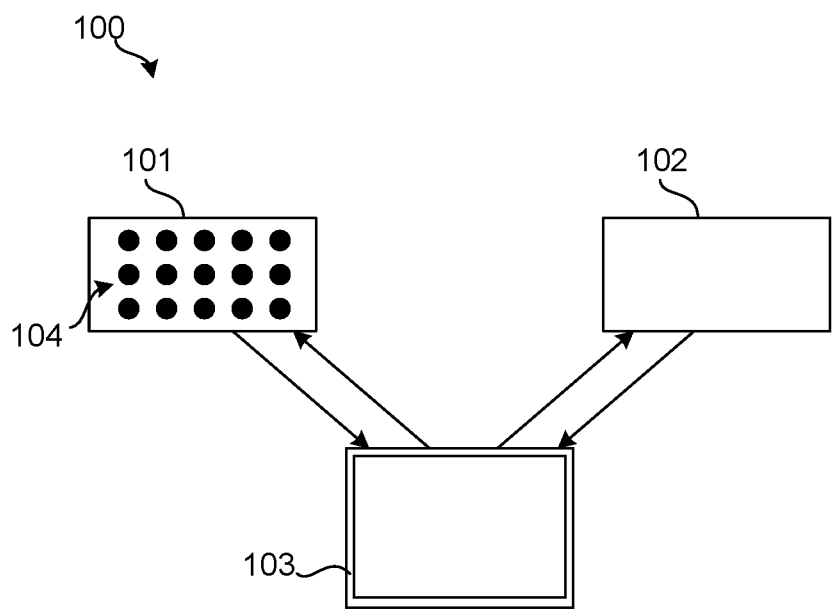
FIG. 1 illustrates a quantum computing system.

FIG. 1 illustrates a quantum computing system 100 comprising quantum processor 101, a distributed data processing system 102 and a user interface device 103. In the example of FIG. 1 the user interface device is a local computer system that is also the main control system of quantum processor 101 in the sense that a user can interact with the local computer system 103 to gain access to the quantum processor 101. In other words, the user controls the data that is being processed by quantum processor 101 through local computer system 103. In other examples, however, the user interface 103 is separate from the control system of the quantum processor 103.

Quantum processor 101 implements one or more operations on multiple qubits 104. In this example, the multiple qubits are in the form of a 5-by-3 array of qubits but other arrangements including linear arrays and other structures with many more qubits are equally possible. Example architectures that can be controlled using the disclosed system include Google's Bristlecone and IBM's Q Experience. Operations implemented by quantum processor 101 may include a universal gate set to perform "circuit model" quantum computing, entangling operations for measurement-based quantum computing, or adiabatic evolutions for adiabatic quantum computing.

Figure 2:
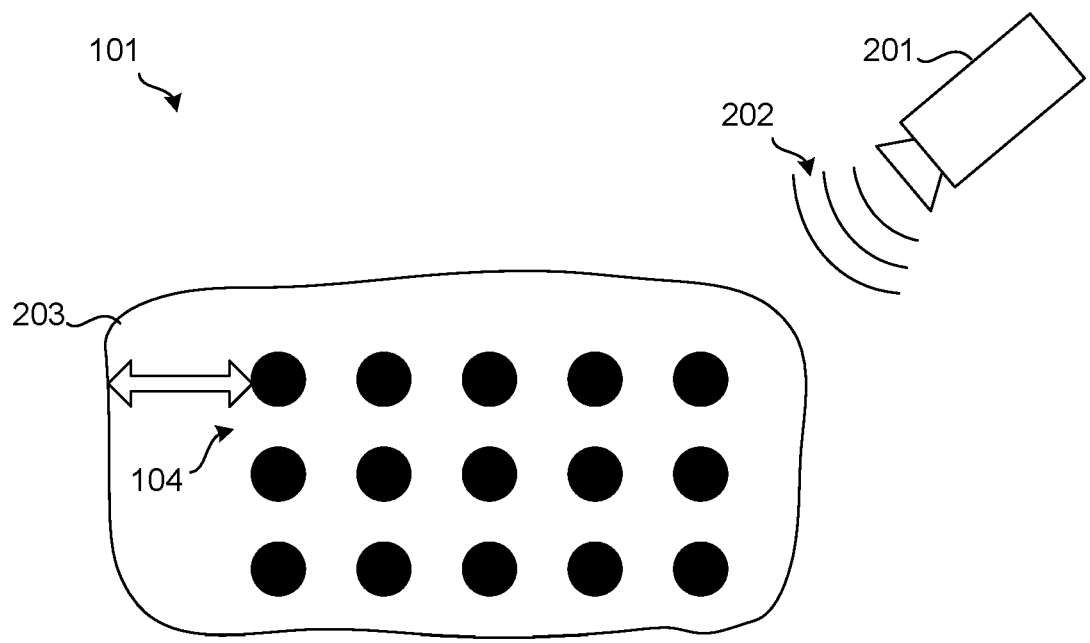
FIG. 2 illustrates the quantum processor from FIG. 1 in more detail.

FIG. 2 illustrates quantum processor 101 in more detail. In particular, quantum processor 101 comprises qubits 104 as in FIG. 1 but there is now also shown a control signal source 201 which generates a control signal 202 to control the qubits 104. The control signal may be an RF, microwave, or optical signal depending on the physical implementation of the qubits. It may be delivered globally or locally to the qubits, depending on the architecture and implementation. The signal may be individually tailored for each qubit or may be applied homogeneously to all qubits. The control signal 202 may be the same signal generally used to apply quantum operations to qubits 104, or may be a separate parallel control system.

Importantly, there is also an environment 203 in which the qubits 104 operate. Environment 203 is drawn as an irregular shape to indicate that it is relatively difficult to accurately characterize and behaves in a random manner, though it may exhibit correlations in space and time. More particularly, qubits 104 interact with the environment in an undesired but unavoidable way. For example, qubits 104 may interact with the environment 203 through various mechanisms which leads to decoherence of the quantum information stored on qubits 104. Environment 203 may be the same across many qubits 104 in processor 101, or may vary strongly between qubits. Without countermeasures, this decoherence occurs more quickly than most quantum algorithms which significantly affects the performance of the individual quantum logic operations within the quantum processor, and of the ultimate algorithm executed on the quantum processor, unless decoherence is reduced. It is therefore the task of control signal 202 to control qubits 104 such that the effects of decoherence are reduced.

Figure 3:
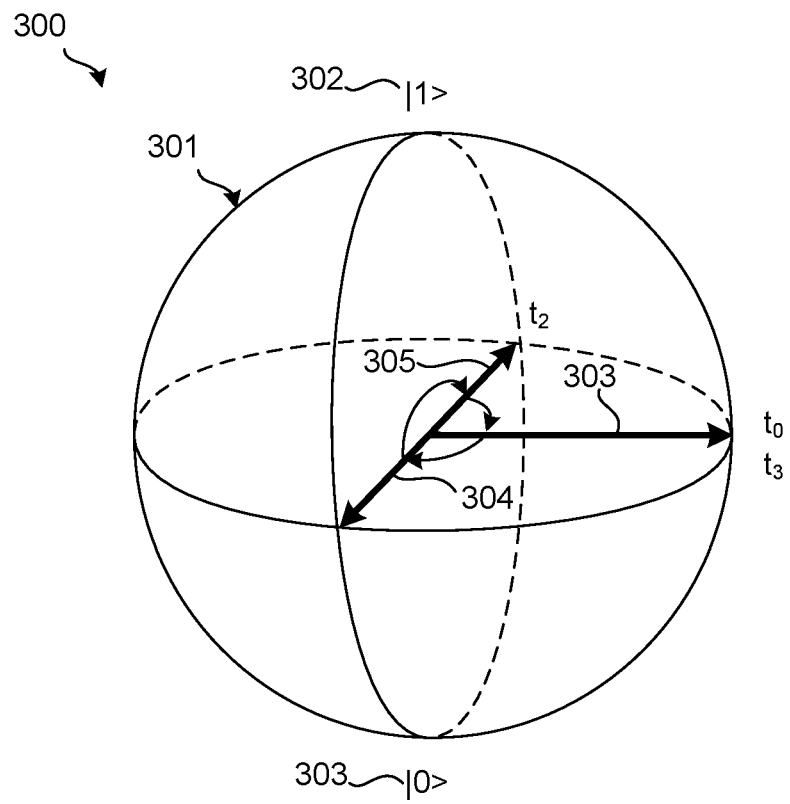
FIG. 3 illustrates a simplified example of a single qubit.

FIG. 3 illustrates a simplified example of a single qubit 300 whose quantum state is represented as a Bloch vector on a Bloch sphere 301 where the north pole 302 represents the |1> basis state (e.g. up spin) and the south pole 303 represents the |0> basis state (e.g. down spin). The current quantum information may be encoded as a superposition of the two basis states as indicated by first vector 303. In the current example the objective is to perform an idle operation, or memory. As a result of the interaction of the qubit 300 with the environment 203 the vector rotates by an unknown and uncontrolled amount, and after a certain time arrives at a different position as indicated by second vector 304. This corresponds to a randomization of the information encoded in the qubit state, described by the state vector. It is now possible apply a control signal that 'flips' the second vector 304 by 180 degrees arriving at a new position as indicated by third vector 305. If the control signal is then turned off for the same time as between 303 and 304, the third vector 305 will rotate exactly to the position of the first vector 303 due to the interaction with the environment. As a result, the influence of the noise as described by the interaction with the environment 203 in this case is perfectly eliminated. This is a simple example of open-loop control which stabilizes a quantum state against environmental decoherence.

Figure 4:
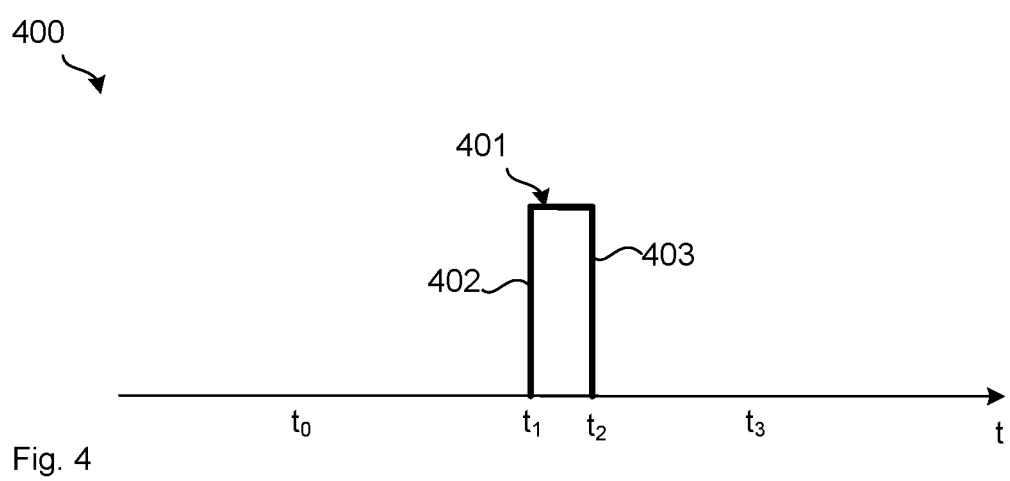
FIG. 4 illustrates an example control sequence.

FIG. 4 illustrates a corresponding control sequence 400 that applies a single control pulse 401 between $t_1$ 402 and $t_2$ 403 to flip the qubit as shown in FIG. 3. In this example, this means that RF source 201 is turned on at $t_1$ and turned off at $t_2$.

While the example in FIGS. 3 and 4 provides perfect elimination of outside noise due to a static "dephasing" interaction with environment 203, the situation is more complicated in practical cases. In particular, environment 203 may vary in time leading to imperfect cancellation of the unwanted rotation via the applied control. Alternatively, the desired quantum operation may be a logically nontrivial operation such as a quantum bit flip or phase flip, in which this simple approach fails. Failure to use a control suited to the characteristics of the environment 203, the coupling mechanism between environment 203 and qubit 300 (one of several within 104), and the desired quantum logic operation being applied to qubit 300 (one of several within 104) will result in qubit decoherence and hence algorithmic errors in quantum processor 101.

Importantly, details of the environment 203 and its coupling mechanism to qubits 104 are specific characteristics of quantum processor 101 and vary in time, with the relevant timescales (microseconds vs hours) again characteristics of quantum processor 101. Further, most interactions with the environment 203 in general cannot be corrected by a single pulse but require multiple controls forming a sequence; the timing and properties of each segment within the sequence is chosen to optimize the performance of the desired operation (including but not limited to memory (I), bit flip (X), phase flip (Z), T, S, CNOT, CPHASE, or other entangling gates). In combination, this leads to a complexity that makes it difficult for local computer systems to efficiently calculate an appropriate control solution.

Further information including mathematical formulations of potential algorithms for the determination of relevant controls can be found in Todd J Green, Jarrah Sastrawan, Hermann Uys and Michael J Biercuk: "Arbitrary quantum control of qubits in the presence of universal noise" New Journal of Physics 15 (2013); H. Ball, W. D. Oliver, and M. J. Biercuk, "The role of master clock stability in quantum information processing," Nature Quantum Information 2, 16033 (2016); which are included herein by reference. In particular, these papers addresses the problem of deriving expressions for calculating universal decoherence-induced errors in qubits undergoing arbitrary, unitary, time-dependent quantum control protocols. They show that the fidelity of a control operation may be expressed in terms of experimentally relevant spectral characteristics of the noise and of the control, over all Cartesian directions. There is a formulation of control matrices in the time domain to capture the effects of piecewise-constant control, and shows how convert them to generalized Fourier domain filter functions. These generalized filter functions may be derived for complex temporally modulated control protocols, accounting for susceptibility to rotations of the qubit state vector in three dimensions. In addition the filter functions may be used as a tool for the determination of error suppressing controls as demonstrated in A. Soare, H. Ball, D. Hayes, M. C. Jarratt, J. J. McLoughlin, X. Zhen, T. J. Green and M. J. Biercuk, "Experimental noise filtering by quantum control", Nature Physics 10, 825-829 (2014); H. Ball and M. J. Biercuk, "Walsh-synthesized noise-filtering quantum logic," EPJ Quantum Technology 2, 1 (2015). These concepts have been extended to address the specific needs of multiqubit gates in T. J. Green and M. J. Biercuk, "Phase-modulated decoupling and error suppression in qubit-oscillator systems," arXiv: 1408.2749 Physical Review Letters 114 120502 (2015). Taken together, it is shown that this framework provides a computationally efficient means to calculate the effects of universal noise on arbitrary quantum control protocols, producing results comparable with those obtained via time-consuming simulations of Bloch vector evolution. As a concrete example, the method can be applied to treating the problem of dynamical decoupling (implementation of memory) incorporating realistic control pulses of arbitrary duration or form, including the replacement of simple a-pulses with complex dynamically corrected gates.

Specific algorithms designed to allow efficient determination of the characteristics of environment 203 are described in V. M. Frey, S. Mavadia, L. M. Norris, W. de Ferranit, D. Lucarelli, L. Viola, and M. J. Biercuk, "Application of optimal band-limited control protocols to quantum noise sensing," Nature Communications 8, 2189 (2017); L. M. Norris, D. Lucarelli, V. M. Frey, S. Mavadia, M. J. Biercuk, L. Viola, "Optimally band-limited spectroscopy of control noise using a qubit sensor," arXiv:1803.05538 (2018); and G. A. Alvarez and D. Suter, "Measuring the spectrum of colored noise by dynamical decoupling," Physical Review Letters 107, 230501 (2011). These algorithms describe the appropriate controls to apply to qubits 104 in quantum processor 101, as well as the data-fusion processes to be executed in order to efficiently determine the noise spectra and coupling mechanisms describing environment 203.

Additional relevant algorithms using similar physics in order to implement closed-loop controls based on measurement feedback are described in J. Sastrawan, C. Jones, I. Akhalwaya, H. Uys, and M. J. Biercuk, "Analytically exploiting noise correlations inside the feedback loop to improve locked-oscillator performance," Physical Review E 94, 022204 (2016); S. Mavadia, V. Frey, J. Sastrawan, S. Dona, M. J. Biercuk, "Prediction and real-time compensation of qubit decoherence via machine learning," Nature Communications 8, 14106 (2017). In these works the filter function again forms a tool to determine appropriate stabilization corrections to be applied to qubits undergoing decoherence from environment 203, based on measurements performed in time on qubits 104. The information extracted from the measurement record may be used to produce a "predictor" of future decoherence and appropriate countermeasures deployed to pre-emptively stabilize the qubits 104 against the action of environment 203.

As it was noted above, the computational complexity for these calculations and others of interest is high. For example, calculating a control sequence for just one CNOT quantum logic operation can take upwards of tens of minutes using conventional desktop computing hardware. Extending this to complex algorithms with dozens or hundreds of quantum logic operations performed between many qubits, each precisely timed, becomes computationally impractical for any desktop system.

Distributed data processing system 102 is programmed to perform these calculations to determine control sequences. As described above, when the control sequences are applied to the quantum processor 101, they reduce decoherence and decoherence-induced errors on the one or more operations on the multiple qubits.

To this end user interface device 103 remote from the distributed data processing system 102 receives from a user of the quantum processor 101 characteristics of the quantum processor 101 including operational constraints, desired performance, and/or characteristics of environment 203. User interface 103 sends the characteristics to the data processing system 102 to cause the data processing system 102 to perform the calculations to determine the control sequence based on the characteristics.

Figure 5:
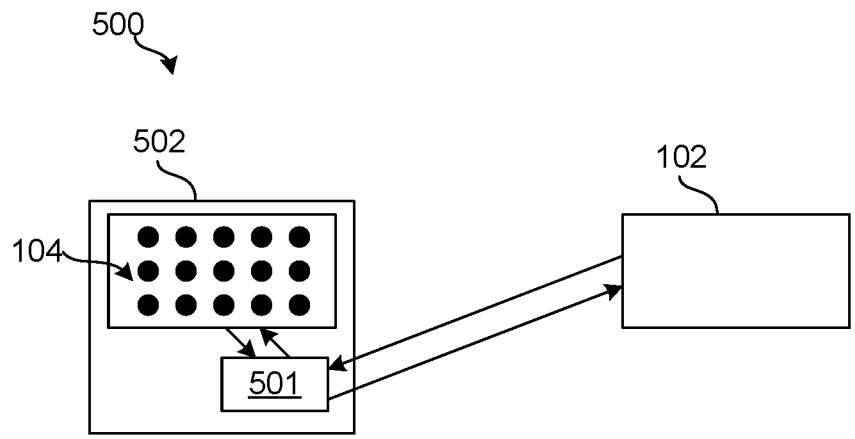
FIG. 5 illustrates another example of a quantum computing system with embedded code.

FIG. 5 illustrates another example of a quantum computing system 500 which now comprises embedded code 501 within a quantum processor 502. The embedded code 501 autonomously optimizes the quantum processor 502 in communication with the distributed data processing system 102. The embedded code may be installed (e.g. on a Flash card) on an embedded micro controller or processor, such as an ARM or Pentium processor, or on an FPGA (field programmable gate array) customized to the task of controlling quantum processor 502. Embedded in this context means that the processor 501 is physically linked to quantum processor 502 and will in general have constraints on computational performance and capacity. Further, from the user perspective, the quantum processor 502 with the code 501 embedded therein appears to the user as a single device in the sense that the user interacts directly with the embedded code 501 instead of the qubits 104 directly. Embedded code 501 may also have real-time characteristics in the sense that a maximum response time is guaranteed to ensure in-time control and correction of the qubits 104 based on current measurements. Embedded code 501 may execute a variety of tasks including execution of hardware-level controls as commanded by other elements of quantum processor 502.

Figure 6:
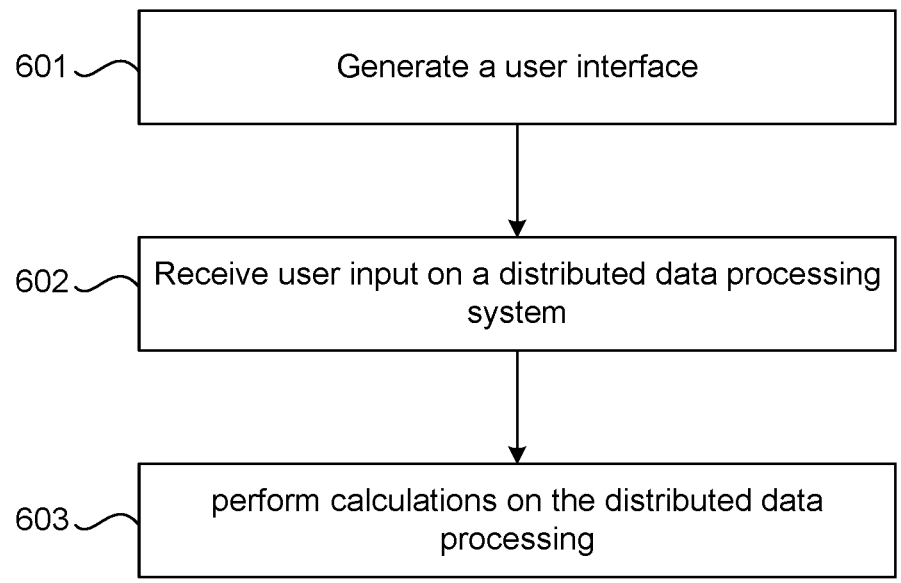
FIG. 6 illustrates a method for controlling a quantum processor as performed by a distributed data processing system.

FIG. 6 illustrates a method for controlling quantum processor 100 that implements one or more operations on multiple qubits as determined via calculations performed by distributed computing environment 102. The distributed computing environment 102 generates 601 a user interface, which can be used to receive user input in relation to characteristics of the quantum processor from a user of the quantum processor. This may involve generating a website, such as be writing HTML code to a web-accessible storage location or by dynamically modifying a website such as using existing web frameworks, such as the angular/flask framework or using JavaScript, AJAX or other web technologies.

Distributed processing system 102 receives 602 the user input and performs 603 calculations based on the user input to determine a control sequence. As explained above, when the control sequence applied to the quantum processor 102 or 502 (i.e. the qubits 104), the sequence reduces decoherence, decoherence-induced errors, and control-imperfection-induced errors on the one or more operations on the multiple qubits.

In one example, the user may not have the full characterization of the qubits 104 at hand or the characteristics may simply be not known for a new configuration or implementation of qubits. In this scenario, the user can initiate a characterization routine, which means the user input comprises a request for determining characteristics of the quantum processor 102. The distributed data processing system 102 then performs calculations based on the user input to determine a control sequence that, when applied to the quantum processor, allows a measurement of the characteristics of the quantum processor.

For example, the characteristics of the processor 102 may comprise distortions of the desired control waveforms, which can be measured by applying a control sequence that probes the system response. This includes modulated pulses designed to probe the system response at fixed frequencies on long time scales and pulses constructed to probe transient responses. The result is information about the ability of processor 101 to implement desired controls without distortion which may be returned to distributed data processing system 102. There, algorithms may calculate pre-compensation schemes which offset these characteristics or otherwise suitably account for them in determining controls to be applied to qubits 104.

In another example, measurement of the characteristics comprises calculating a frequency domain filter function on the distributed data processing system for the determined control sequence to be applied to qubits 104. The filter function can then be applied to the process of error budgeting and control selection in the sense that filter response calculations from the area of system theory can be applied to the system. For example, a convolution of the control (described by a filter function) with an input signal causing decoherence would yield an expected output signal (e.g. an error probability). The convolution of control and noise in the time domain is efficiently represented as a product in the frequency domain, constituting an advantage of this approach. This can be used to optimize the control sequence as the input function until a desired output signal is calculated.

In yet a further example, the user input comprises an indication of control waveforms created by the user through the user interface. For example, the user may wish to apply a specific control waveform designed by the user to suppress known errors or determined by others in the open literature to the processor 102 or may already know which waveform is optimal for the given implementation. This waveform may then be compared with others input by the user and analyzed via computations performed by distributed data processing system 102. In that case, it is an advantage that the user can specify the waveform in the user interface and this way conveniently analyze the waveform in the software package.

There may also be a library of waveforms and protocols that may be stored on distributed data processing platform 102 and presented to the user via a drop down menu, for example. When the user selects one of the waveforms or protocols and submits the selection, the user input as received by the distributed data processing platform 102 comprises an indication of one or more control protocols or waveforms or both. The library may be pre-computed in the sense that computationally intensive calculations that are generic (not specific) to a particular implementation have been performed earlier and the results stored in the library for future use to calculate a solution for a specific implementation or architecture.

For example, the calculations may involve the analysis of control waveforms to determine an error budget of the multiple qubits 104, determined from one or more selected controls and the characteristics of quantum processor 101 as sent to the distributed data processing system 102 via multiple means. The error budget can then be displayed on the user interface 103.

There are different control paradigms that can be used in this context, including open loop and closed loop. In open loop control, the qubits 104 are characterized and then the control sequence is calculated using this characterization by mathematically minimizing the expected decoherence of the characterized qubits 104. In closed loop control, there are measurements available of the qubits 104 which allow the iterative refinement of the control sequence to optimize the actually observed quantity. Both paradigms can be implemented in the realm of system theory which is based on transfer functions, frequency responses and frequency analysis after transformation from the time domain including Fourier transformation. This may involve the multiplication of the frequency domain response function with the frequency domain control sequence (equivalent to the convolution of the time domain functions) to determine an expected output signal. Further, in closed-loop control repeated measurements may be used to perform real-time correction of the qubit's state. The correction to be applied may be determined using algorithms involving the filter function or other algorithms capable of extracting information about future evolution from past measurements. This closed-loop control can also be combined with optimized open-loop control. This representation can be used to minimize the expected decoherence.

Another important aspect of the calculations is the ability to input characteristics of noise, which also represents the characteristics of interaction with the environment 203 (see FIG. 2). The user may enter known noise characteristics into user interface 103 or the distributed processing system 102 may determine a control sequence that allows the measurement of the noise characteristics from the qubits 104. The measurement results may then be returned to the distributed data processing system 102 for further calculations to be performed in determining the characteristics of qubits 104 and environment 203 based on algorithms above. For example, the control sequence applied may make qubits 104 sensitive to only one specific frequency (i.e. narrow frequency band) which can be used as a probe to measure the noise at this specific frequency. Measurement results may then be combined according to an algorithm in the distributed data processing system 102 in order to determine a frequency-resolved spectrum of noise characterizing environment 203. The calculations to determine the control sequence for the operation of the quantum processor 101 then use the noise characteristics to determine the control sequence that minimizes decoherence.

As an alternative to direct user input, measurements may be taken over time to iteratively and autonomously optimize the control sequence. Autonomous in this context means that the quantum processor 502, with the embedded code, performs the measurement and the update of the noise profile characterizing environment 203 or other system parameters of quantum processor 502, or determination of optimal controls without direct intervention by a user. The embedded code 501 may perform a set of computations without interaction with distributed data processing system 102.

In other examples, the distributed data processing system 102 does become involved in the sense that it receives current measurements from the quantum processor 502 and adjusts the control sequences based on the current measurements. The distributed data processing system 102 then sends the adjusted control sequence to the quantum processor 502 to update information stored in embedded controller 501. Embedded controller 501 may then be requested by other control systems within quantum computing system 502 to apply optimal or otherwise calculated control operations designed to suppress decoherence and error.

The noise characteristics may include a range of different parameters including a predefined clock noise (deviation in the arrival time of the clock signal), a predefined ambient dephasing (a rotation of the qubit due to entanglement with the environment 203 as shown in FIG. 3, a predefined amplitude noise (a variation in the length of the measured vector or the received power); and a noise spectrum determined from the user input (indicative of different noise contributions at different frequencies).

In addition or alternative to the noise compensation, the control sequence may also cause the qubits 104 to adopt adjusted system dynamics that are different from native system dynamics of the quantum processor 502, which is also referred to as quantum simulation. This expands the computational capabilities of the quantum processor 502.

Figure 7:
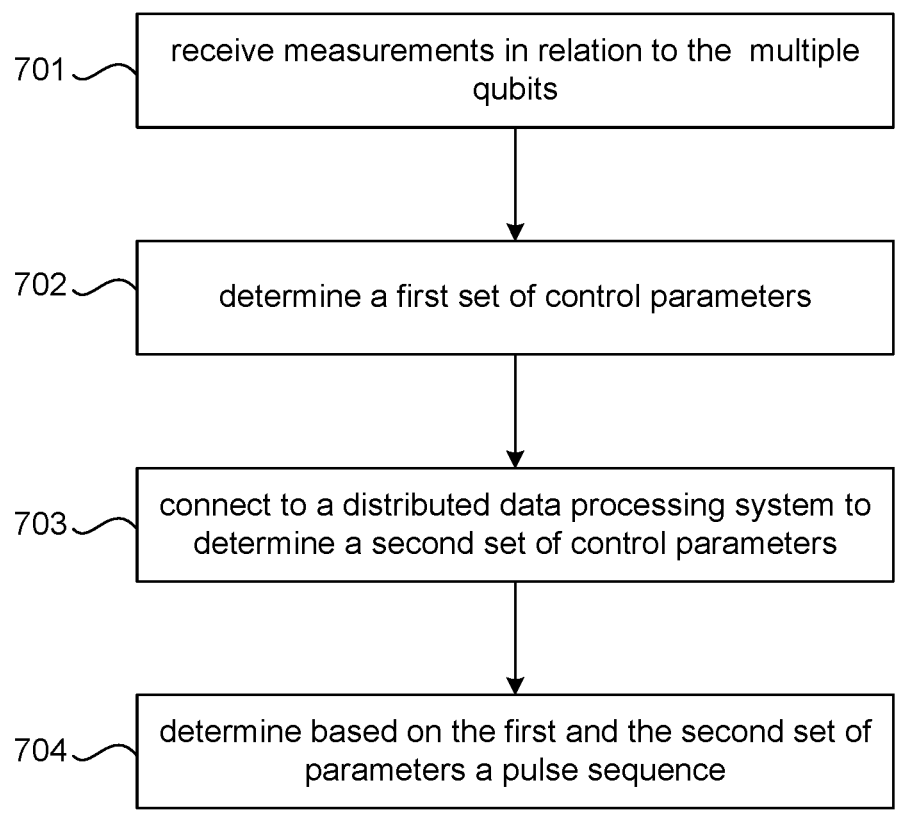
FIG. 7 illustrates a method for controlling a quantum computing processor as performed by code embedded in a quantum processor.

FIG. 7 illustrates a method 700 for controlling a quantum computing processor 501 that implements one or more operations on multiple qubits 104. In this case, method 700 is performed by the embedded code 501 and comprises executing code 501 to perform the following operations. First, the embedded code 501 schedules calibration measurements and receives 701 measurements in relation to the multiple qubits, such as noise measurements based on a prescribed measurement control sequence. The embedded code 501 then connects to a distributed data processing system 102 to cause the distributed data processing system 102 to perform calculations to determine a set of control parameters based on calculations performed by the distributed data processing system and measurement results 701. For instance these parameters may reconstructed noise spectra characterizing environment 203. These parameters are used by the distributed data processing system to determine a control sequence that, when applied to the quantum processor, reduces decoherence and decoherence-induced errors on the one or more operations on the qubits 104. This control sequence is returned to the embedded processor 501 and stored locally. This is then used to update local information determining the definition of control operations executed on the qubits 104. Such local information may include machine-language descriptions of abstracted quantum logic operations such as quantum bit flips (X) or phase flips (Z). In such a case whenever an algorithm calling for a quantum bit flip or phase flip operation is executed, the definitions stored locally by the embedded processor are called and sent to the physical control hardware 201 which executes operations on qubits 104.

Todd J Green, Jarrah Sastrawan, Hermann Uys and Michael J Biercuk: "Arbitrary quantum control of qubits in the presence of universal noise" New Journal of Physics 15 (2013) as referenced above provides an analytic expression for calculating universal decoherence-induced errors in qubits. In particular, the control matrix in the frequency domain is described as $$R(\omega) = \sum_{l=1}^{n} e^{i\omega t_{l-1}} R^{P_l}(\omega) \Lambda^{(l-1)}$$

where $$R^{P_l}(\omega) \equiv -i\omega \int_0^{t_l - t_{l-1}} dt \, e^{i\omega t} R^{p_l}(t)$$

This describes a filter function for an arbitrary operation performed on a single qubit which is calculated on the distributed data processing system 102. The operation may be described as piecewise-constant but containing many (n) time-segments in order to approximate a smoothly varying control waveform (for example a Gaussian-shaped pulse implementing a quantum bit flip). As a result the filter function calculation is computationally challenging.

This architecture has the advantage that the computationally intensive tasks which are not appropriate for the embedded code are outsourced to the distributed data processing system 102. Less intensive tasks can be performed close to the qubits 104 which reduces the latency. At the end, information from both the distributed data processing system and embedded code are used to determine the final control sequence that is to be applied to the qubits 104.

In one example, the embedded code 501 queries the distributed data processing system 102 at set intervals or other schedules to update the parameter set from the distributed data processing system 102 regularly. It may not be apparent from the operation of the quantum processor 502 when a new set of parameters is required and therefore it is useful to have a schedule that ensures that the parameters are updated regularly based on a schedule.

In another example, the distributed data processing system 102 may calculate parameters across a range of different scenarios, such as for 1,000 different sample points of an operational space. When these parameters are updated or received by the embedded code 501 from the distributed data processing system 102, the embedded code 501 repeatedly stores the parameters in a look-up table according to the schedule. Embedded code 501 can then apply the control sequence to the multiple qubits by reading the parameters from the look-up table between scheduled updates and determine the control sequence based on the parameters from the look-up table. In this way, the operation of the qubits 104 can vary across the operational space without requiring further updates from the distributed data processing system 102. Again, while the calculation for one point in the operational space is already computationally intensive, the calculation of many points across the space is certainly a difficult task for most standard computers.

In yet a further example in which the embedded code 501 interacts with distributed data processing system 102, certain closed-loop control protocols involve combining local measurement outcomes in real time with pre-calculated coefficients from large data sets. While the latter is computationally intensive and best suited to the distributed processor, coefficients pre-calculated via the distributed data processing system 102 can be sent to embedded code 501; here new measurement results from qubits 104 may be combined with these coefficients using a known mathematical function using embedded code 501.

More specifically, in Sandeep Mavadia, Virginia Frey, Jarrah Sastrawan, Stephen Dona & Michael J. Biercuk; "Prediction and real-time compensation of qubit decoherence via machine learning", Nature Communications volume 8, Article number: 14106 (2017) the authors describe a procedure in which they first calculate weighting coefficients w for past measurements which will then be combined to allow future prediction of qubit state evolution. The optimization procedure calculating w from a large data set is computationally intensive and performed via the distributed data processing system 102. However the real-time combination of recent measurements $\phi_i^M$ using a pre-calculated w stored in the embedded processor, to return a prediction of the label $\phi^P(t_k)$ at time $t_k$, may be performed with low computational complexity via the local embedded code 501.

Figure 8:
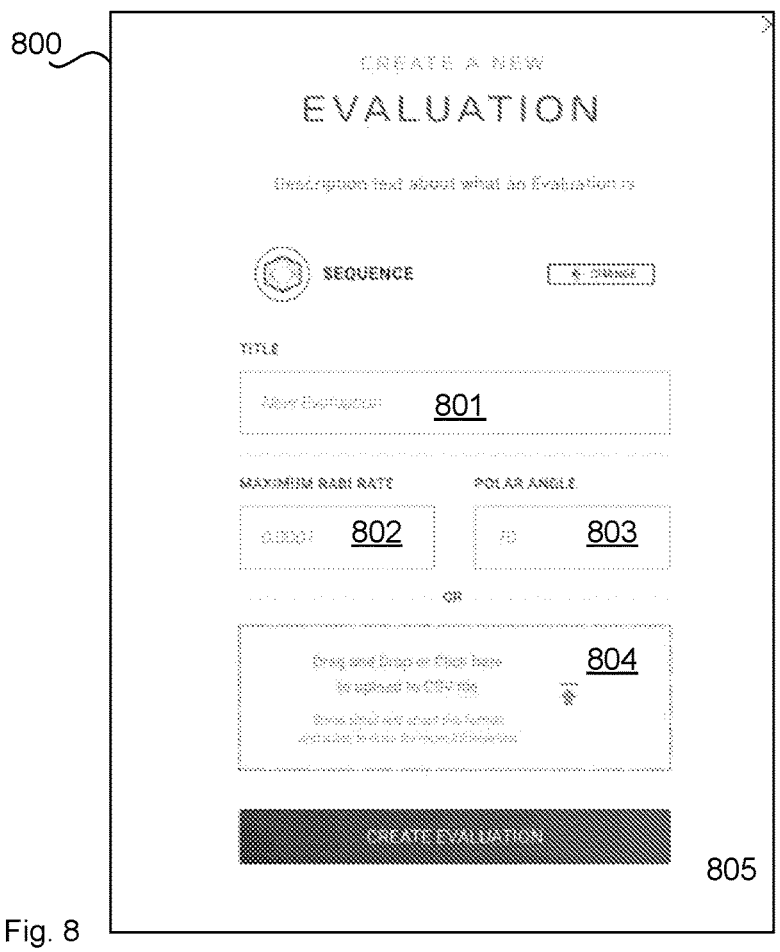
FIG. 8 illustrates an example user interface where a user can create a new evaluation.

FIG. 8 illustrates an example user interface 800 where a user can create a new evaluation, which is a process to generate characteristics of the quantum processor 101 by analyzing a control operation. User interface 800 comprises input fields for a evaluation title 801 and maximum Rabi rate 802, polar angle 803. Alternatively, user may drag and drop or select a CSV or other data file that contains the desired information. Finally, the user can submit the data by activating a submit button 805. The specific elements of the user interface may be tailored for different kinds of relevant control operations to be examined.

Figure 9:
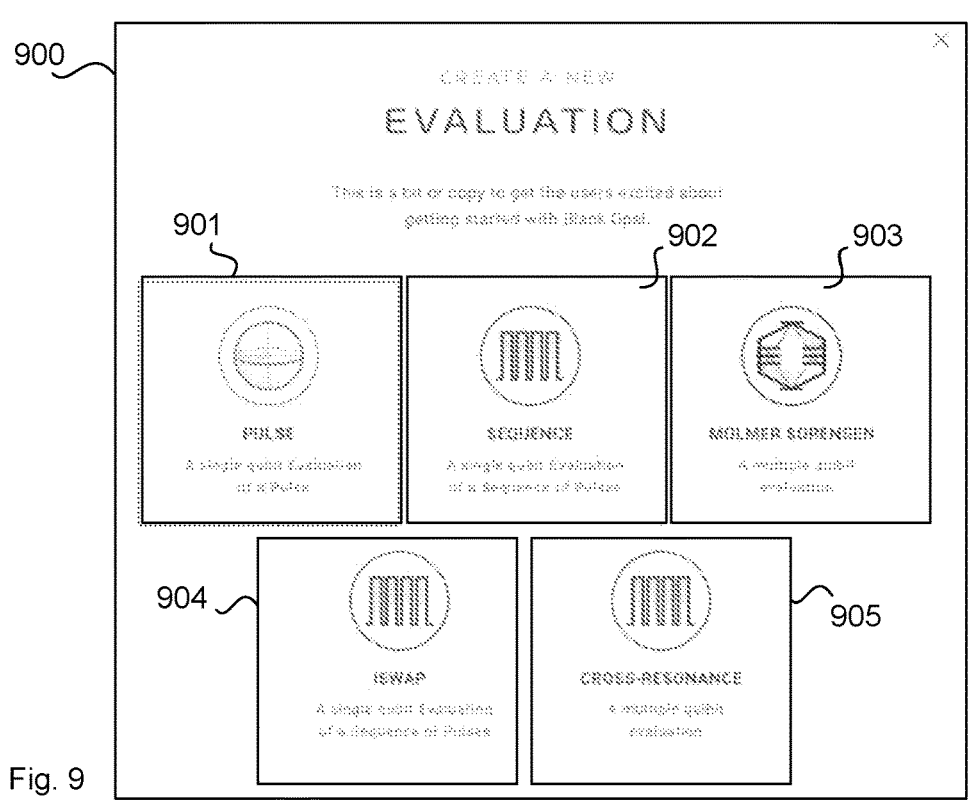
FIG. 9 illustrates a user interface where the user can select one of different evaluation options.

FIG. 9 illustrates a user interface where the user can select one of different evaluation options including a single qubit evaluation of a control pulse 901, a single qubit evaluation of a timed sequence of control pulses 902, an evaluation of a multiple qubit Mølmer-Sorensen gate 903, a single qubit evaluation of a sequence of pulses 904 and a cross-resonance multiple qubit evaluation 905. A wide variety of other evaluations may be performed according to algorithms identified above and accessed through the user interface.

Figure 10:
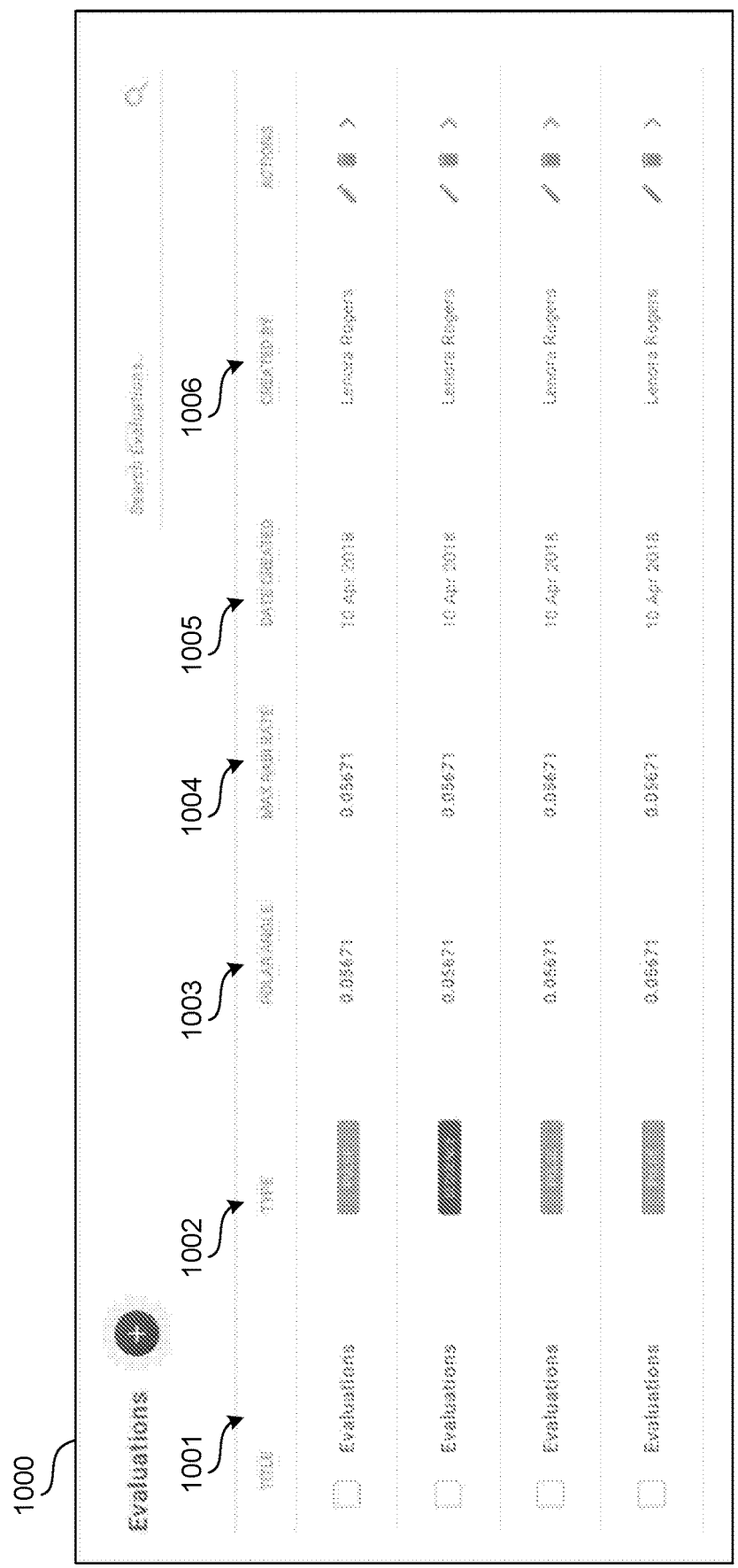
FIG. 10 illustrates a user interface comprising a list of evaluations.

FIG. 10 illustrates a user interface comprising a list of evaluations that each have a field for title 1001, type 1002, polar angle 1003 (which may be the angle measured from the z-axis orthogonal to the axis between |0> and |1> states), maximum Rabi rate 1004 and date created 1005. The user can now conveniently see the evaluations that are defined for the quantum processor 101. A wide variety of possible data display formats and comparison approaches exist within the user interface 1000 useful for creating controls suitable for quantum processor 101.

Figure 11:
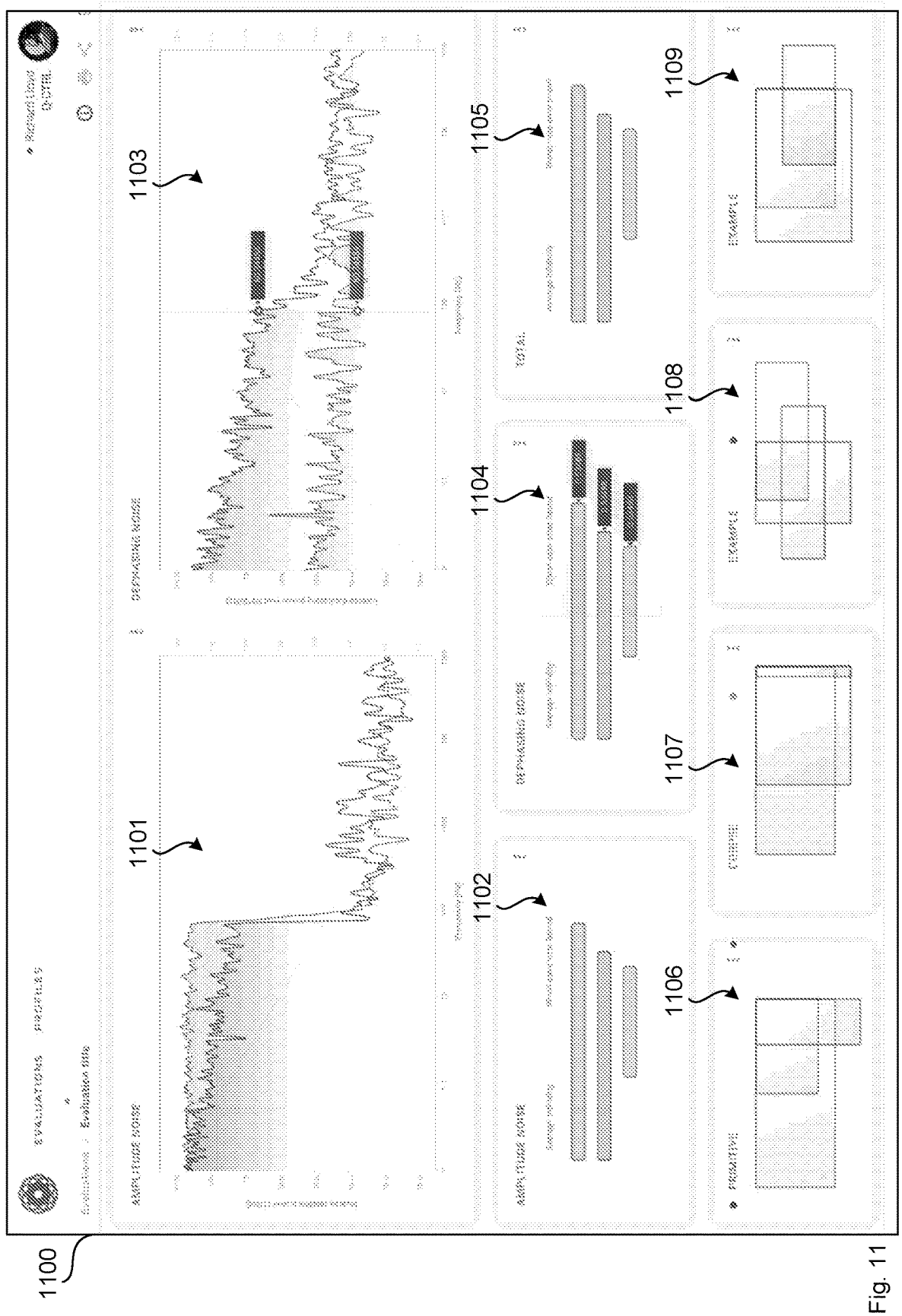
FIG. 11 illustrates a further user interface showing the results of a particular evaluation.
Figure 12:
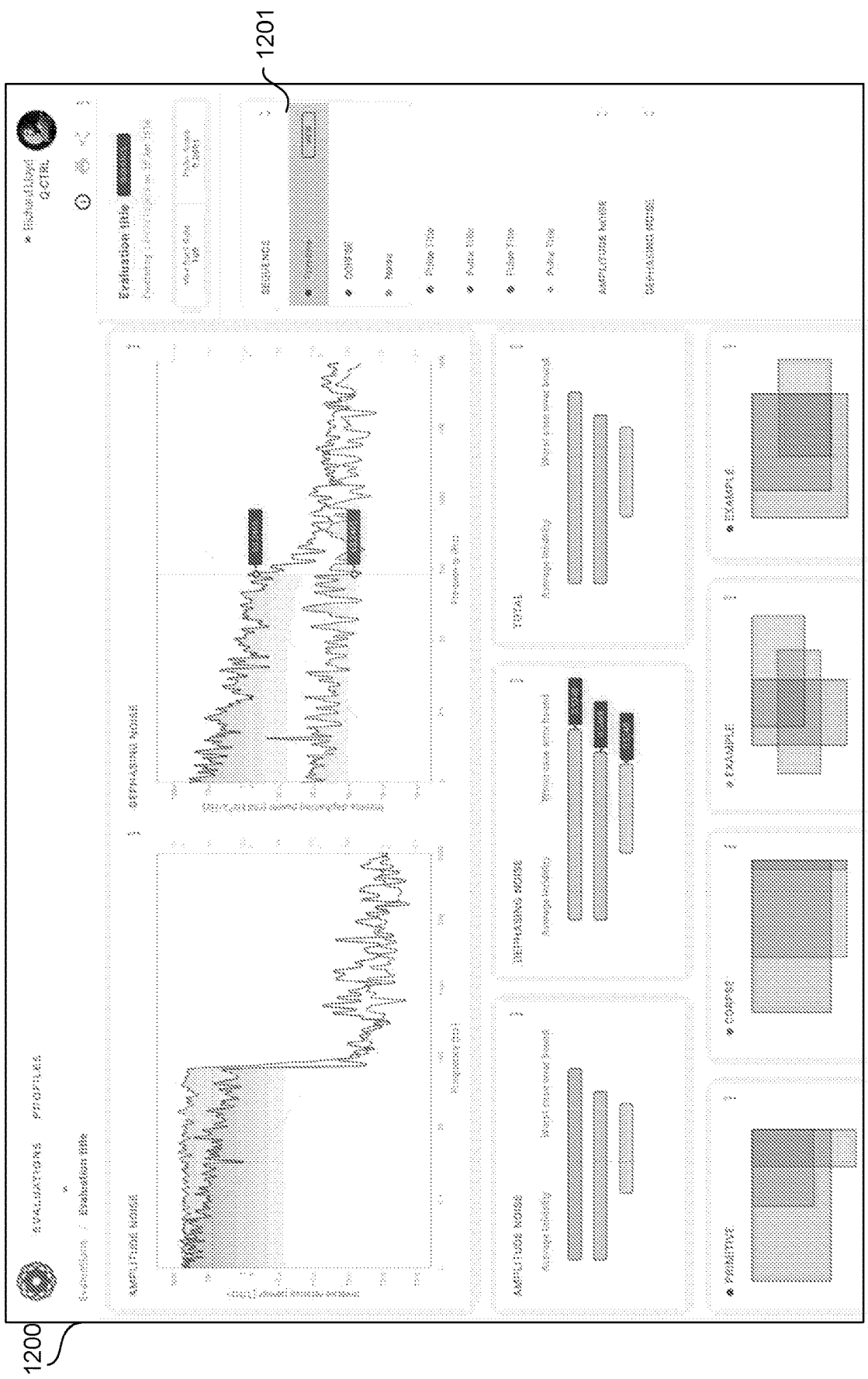
FIG. 12 shows another user interface that is similar to that of FIG. 11 but contains additional user input elements.

FIG. 11 illustrates a further user interface 1100 showing the results of a particular evaluation. In particular, user interface 1100 comprises a spectral representation of amplitude noise 1101 and dephasing noise 1102. The relative performance of different controls (represented visually in 1106, 1107 and 1108), can be represented via bar charts 1102, 1104, 1105 (or other graphical forms) in order to allow easy comparison based on results calculated using the distributed data processing system. Relevant information to be displayed may be average infidelity and worst-case error FIG. 12 shows another user interface 1200 that is similar to that of FIG. 11 but contains additional user input elements 1201. In particular, the user can select between different control sequences including primitive, CORPSE, and others known to suppress errors induced by control imperfections or decoherence from environment 203. Upon selection of a sequence, the user interface 1200 updates to display the results for that control sequence. This way the user can conveniently compare the effects of the different sequences to the quality of the results.

Figure 13:
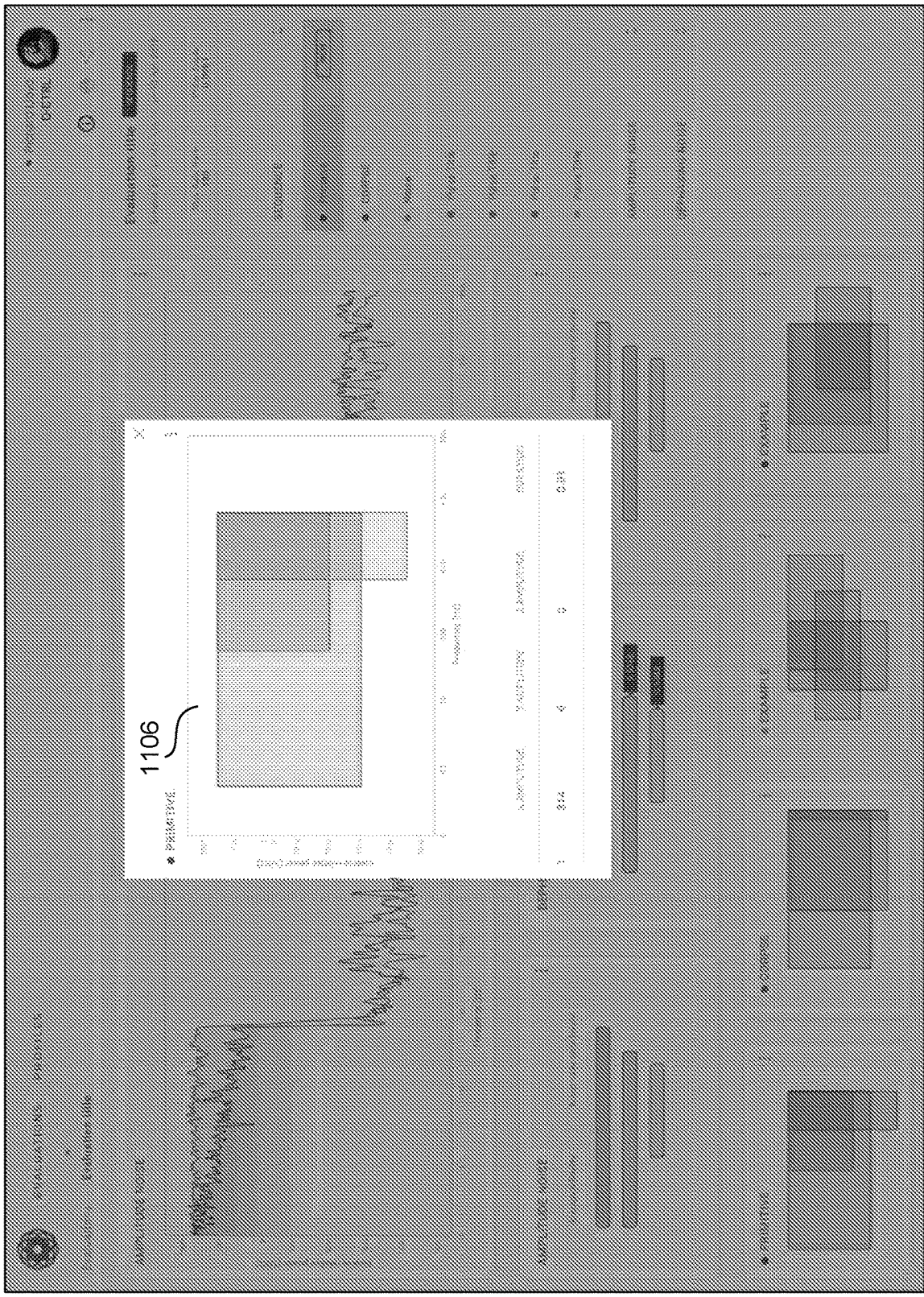
FIG. 13 shows a user interface after the user clicked on one of the box charts in FIG. 11.

FIG. 13 shows a user interface after the user clicked on one of the box charts 1106 in FIG. 11, which brings up the box chart 1106 in more detail.

Figures 14, 15:
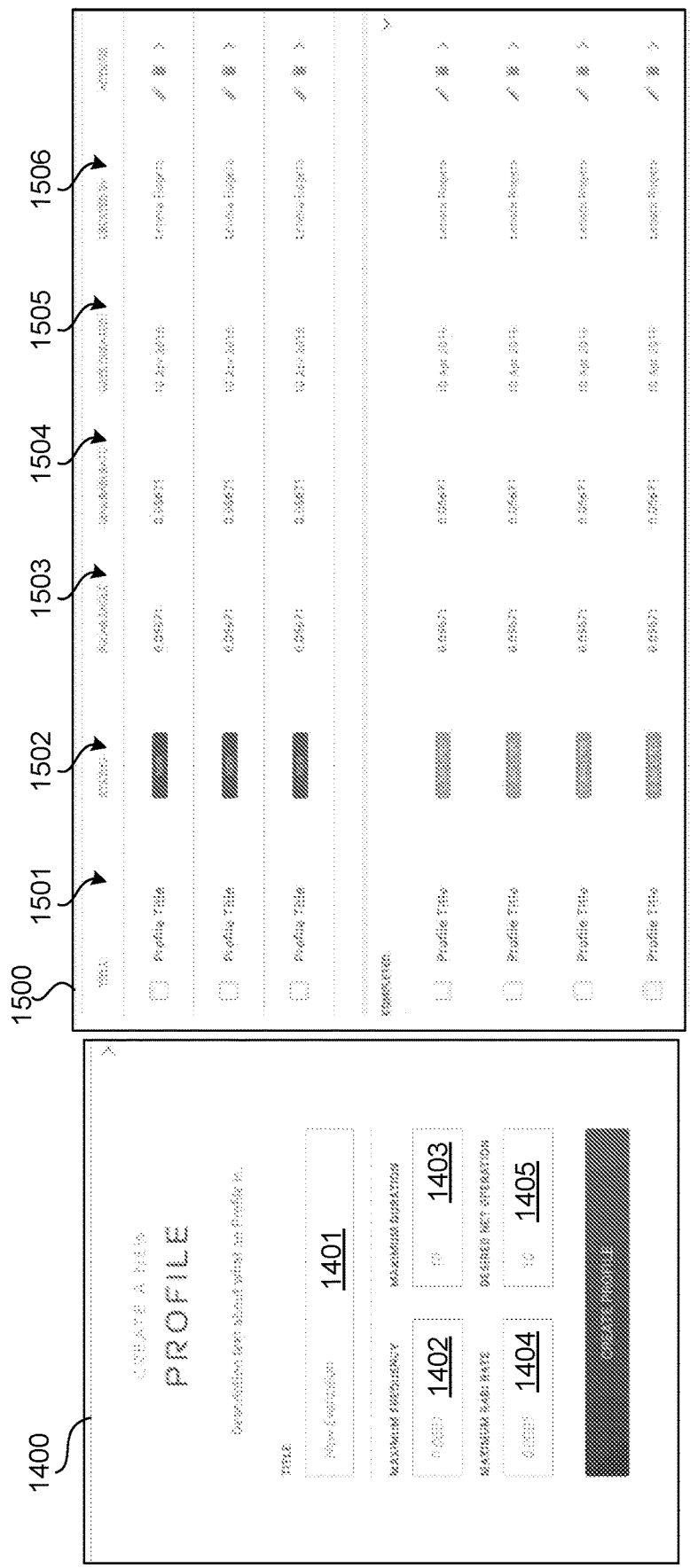
FIG. 14 illustrates a user interface for creating a new profile for characterizing noise in a quantum processor.
FIG. 15 illustrates a user interface that shows the created profiles.

FIG. 14 illustrates a user interface 1400 for creating a new profile for characterizing noise in quantum processor 101. User interface 1400 comprises a title 1401, a maximum frequency 1402, a maximum duration 1403, a maximum Rabi rate 1404 and a desired net operation 1405. A wide variety of approaches to display and compare this information may be produced in the user interface which is an advantage of this approach.

Accordingly, FIG. 15 shows the created profiles with fields for profile title 1501, status 1502, polar angle 1503, max Rabi rate 1504, date created 1505, and created by 1506.

Figure 16:
FIG. 16 illustrates a user interface that displays profile details.

FIG. 16 illustrates a user interface 1600 that displays profile details including max Rabi rate, max frequency, number of samples, duration, max Slepian order, Slepian order type (which relates to finding a time sequence of a given length whose discrete Fourier transform is maximally localized on a given frequency interval, as measured by the spectral concentration), and modulation type. Importantly, user interface 16 also displays the expected noise spectrum 1602 as reconstructed using complex algorithms and measurements returned from quantum processor 101. User interface 1600 also shows the steps requested from the user including step one 1602 of creating a profile and uploading CSV and step two 1603 of uploading results to the distributed data processing system 102.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A quantum computing system comprising:
   quantum processor that implements one or more operations on multiple qubits having qubit states, the quantum processor comprising embedded code configured to perform the following steps when executed: connect to a distributed data processing system and determine a first set of control parameters based on measurements in relation to the multiple qubits, control data stored with the embedded code, and calculations performed by the embedded code;
   the distributed data processing system programmed to perform calculations based on user input to determine a second set of control parameters, the distributed data processing system being further programmed to determine, based on the first set of control parameters and the second set of control parameters, a control sequence that, when applied to the quantum processor in the form of an electromagnetic field to directly control the qubit states, reduces decoherence, decoherence-induced errors, and control-imperfection-induced errors on the one or more operations on the multiple qubits, wherein the calculations are based on noise characteristics of the quantum processor to determine a noise-suppressing control sequence; and
   a user interface device remote from the distributed data processing system to receive from a user of the quantum processor characteristics of the quantum processor including operational constraints and/or desired performance, and to send the characteristics to the distributed data processing system to cause the distributed data processing system to perform the calculations to determine the noise-suppressing control sequence based on the characteristics, wherein the code embedded into the quantum processor is further configured to perform the following steps when executed:
   repeat the steps of determining the first set of control parameters and connecting to the distributed data processing system based on a schedule;
   repeatedly store the first set of control parameters and the second set of control parameters on a look-up table according to the schedule; and
   apply the noise-suppressing control sequence to the multiple qubits by reading the first set of control parameters and the second set of control parameters from the look-up table between scheduled updating of the first set of parameters and the second set of parameters.

2. The system of claim 1, further comprising embedded code within the quantum processor that autonomously optimizes the quantum processor in communication with the distributed data processing system.

3. A method for controlling a quantum processor that implements one or more operations on multiple qubits having qubit states, the method comprising:
   generating a user interface to receive from a user of the quantum processor user input in relation to characteristics of the quantum processor;
   receiving the user input on a distributed data processing system;
   connecting to code embedded in the quantum processor to determine a first set of control parameters based on measurements in relation to the multiple qubits, control data stored with the embedded code, and calculations performed by the embedded code;
   performing calculations on the distributed data processing system based on the user input to determine a second set of control parameters; and
   determining on the distributed data processing system, based on the first set of control parameters and the second set of control parameters, a control sequence that, when applied to the quantum processor in the form of an electromagnetic field to directly control the qubit states, reduces decoherence and decoherence-induced errors on the one or more operations on the multiple qubits, wherein the calculations are based on noise characteristics of the quantum processor to determine a noise-suppressing control sequence, wherein the method further comprises:
   repeating the steps of determining the first set of control parameters and connecting to the distributed data processing system based on a schedule;
   repeatedly storing the first set of control parameters and the second set of control parameters on a look-up table according to the schedule; and
   applying the noise-suppressing control sequence to the multiple qubits by reading the first set of control parameters and the second set of control parameters from the look-up table between scheduled updating of the first set of parameters and the second set of parameters.

4. The method of claim 3, wherein the calculations comprise:
   deriving a Fourier domain filter function for the one or more operations on the multiple qubits based on the characteristics of the quantum processor, the Fourier domain filter function being indicative of effects of noise on the one or more operations on the multiple qubits, and optimizing, based on the Fourier domain filter function, the control sequence.

5. The method of claim 3, wherein the user input comprises a request for determining the noise characteristics of the quantum processor and the method comprises performing calculations on the distributed data processing system based on the user input to determine a control sequence that, when applied to the quantum processor, allows a measurement of the noise characteristics of the quantum processor.

6. The method of claim 5, wherein the noise characteristics of the quantum processor comprise distortions.

7. The method of claim 3, wherein the method further comprises performing a measurement of the noise characteristics of the quantum processor by calculating a frequency domain filter function on the distributed data processing system for the determined control sequence and applying the filter function to direct measurements from the quantum processor.

8. The method of claim 3, wherein the user input comprises an indication of one or more control waveforms created by the user through the user interface.

9. The method of claim 3, wherein the user input comprises an indication of one or more protocols or waveforms or both from a pre-computed library selected by the user through the user interface.

10. The method of claim 3, wherein the control sequence is an open-loop control sequence.

11. The method of claim 3, wherein the calculations are to analyse control waveforms to determine an error budget of the multiple qubits and display the error budget on the user interface.

12. The method of claim 3, wherein the noise characteristics are based on one or more of:
a predefined clock noise;
a predefined ambient dephasing;
a predefined amplitude noise;
a predefined noise in all Cartesian coordinates (x, y, z);
a noise spectrum suitably defined and determined by user measurements; and
a noise spectrum determined from the user input.

13. The method of claim 3, wherein the calculations are based on multiple measurements from the quantum computing hardware platform over time to iteratively and autonomously optimize the control sequence.

14. The method of claim 3, wherein the calculations comprise determining a first control sequence to characterize noise of the multiple qubits in the quantum processor and determining a second control sequence based on the determined noise.

15. The method of claim 3, further comprising:
receiving on the distributed data processing system, current measurements from the quantum processor;
adjusting the control sequence based on the current measurements; and
sending the adjusted control sequence to the quantum processor.

16. The method of claim 3, wherein the calculations comprise determining an error budget for a particular control operation on the multiple qubits based on input, selected, or measured noise, and adjusting the control sequence to minimize an error of the one or more operations on the multiple qubits.

17. The method of claim 3, further comprising generating on the user interface a visualization of the characteristics or the determined control sequence or both.

18. The method of claim 3, wherein the calculations comprise determining a predicted estimation of an evolution of the multiple qubits based on measurements of the multiple qubits and adjusting the control sequence based on the predicted estimation.

19. The method of claim 3, wherein the control sequence causes the multiple qubits to adopt adjusted system dynamics that are different from native system dynamics of the quantum processor to thereby expand the computational capabilities of the system.

20. A method for controlling a quantum computing processor that implements one or more operations on multiple qubits having qubit states, the method comprising:
executing code embedded into the quantum processor to:
receive measurements in relation to the multiple qubits;
determine a first set of control parameters based on:
the measurements,
control data stored with the embedded code, and
calculations performed by the embedded code;
connect the embedded code to a distributed data processing system to cause the distributed data processing system to determine a second set of control parameters based on calculations performed by the distributed data processing system and based on noise characteristics of the quantum processor to allow determination of a noise-suppressing control sequence; and
determine based on the first set of parameters and the second set of parameters the noise-suppressing control sequence that, when applied to the quantum processor in the form of an electromagnetic field to directly control the qubit states, reduces decoherence and decoherence-induced errors on the one or more operations on the multiple qubits, wherein the method further comprises executing code embedded into the quantum processor to:
repeat the steps of determining the first set of control parameters and connecting to the distributed data processing system based on a schedule;
repeatedly store the first set of control parameters and the second set of control parameters on a look-up table according to the schedule; and
apply the noise-suppressing control sequence to the multiple qubits by reading the first set of control parameters and the second set of control parameters from the look-up table between scheduled updating of the first set of parameters and the second set of parameters.

21. A quantum processor comprising:
multiple qubits having respective qubit state vectors configured to implement one or more operations on the multiple qubits;
code embedded into the quantum processor to perform the following steps when executed:
receive measurements in relation to the multiple qubits;
determine a first set of control parameters based on:
the measurements,
control data stored with the embedded code, and
calculations performed by the embedded code;
connect the embedded code to a distributed data processing system to cause the distributed data processing system to determine a second set of control parameters based on calculations performed by the distributed data processing system and based on noise characteristics of the quantum processor to allow determination of a noise-suppressing control sequence; and determine based on the first set of parameters and the second set of parameters the noise-suppressing control sequence; and a controlled source to apply the noise-suppressing control sequence to the quantum processor in the form of an electromagnetic field to directly control the qubit state vectors to reduce decoherence and decoherence-induced errors on the one or more operations on the multiple qubits, wherein the code embedded into the quantum processor is further configured to perform the following steps when executed:

repeat the steps of determining the first set of control parameters and connecting to the distributed data processing system based on a schedule;

repeatedly store the first set of control parameters and the second set of control parameters on a look-up table according to the schedule; and apply the noise-suppressing control sequence to the multiple qubits by reading the first set of control parameters and the second set of control parameters from the look-up table between scheduled updating of the first set of parameters and the second set of parameters.

\* \* \* \* \*